United States Patent

[11] 3,565,394

| [72] | Inventor | George W. Smith |
| | | Conroe, Tex. |
| [21] | Appl. No. | 781,065 |
| [22] | Filed | Dec. 4, 1968 |
| [45] | Patented | Feb. 23, 1971 |
| [73] | Assignee | Texas Valve Specialty, Inc. |

[54] BUTTERFLY VALVE
10 Claims, 7 Drawing Figs.

[52] U.S. Cl..................................................... 251/306;
   251/151
[51] Int. Cl..................................................... F16k 1/226
[50] Field of Search........................................ 251/151,
   305, 306; 137/454.2, 375

[56] References Cited
UNITED STATES PATENTS
1,977,351  10/1934  Phillips........................... 251/306

| 3,072,139 | 1/1963 | Mosites....................... | 251/306X |
| 3,173,650 | 3/1965 | Cotterman et al............ | 251/306 |
| 3,325,142 | 6/1967 | Thompson..................... | 251/306 |
| 3,376,015 | 4/1968 | Forsman et al. .............. | 251/306 |
| 3,447,780 | 6/1969 | Hobson, Jr. .................. | 251/306 |

Primary Examiner—William R. Cline
Attorney—Jennings, Carter & Thompson

ABSTRACT: A butterfly valve having annular flow passage and seat with disc mounted on shaft for rotation therein. Disc has lip seal at its periphery with outwardly facing convex seal surface surrounding shaft and engaging inwardly facing concave seal surface on seat with seal surfaces being in shape of segment of sphere struck on substantially same radius as radius of annular seat.

INVENTOR.
George W. Smith
BY
Jennings, Carter & Thompson
Attorneys

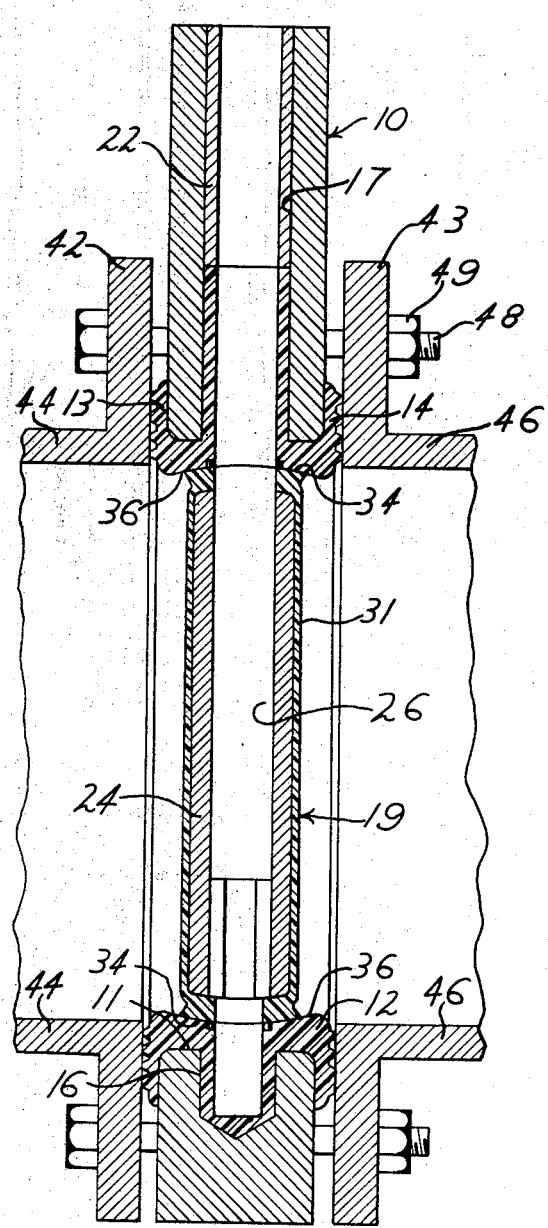
Fig. 3
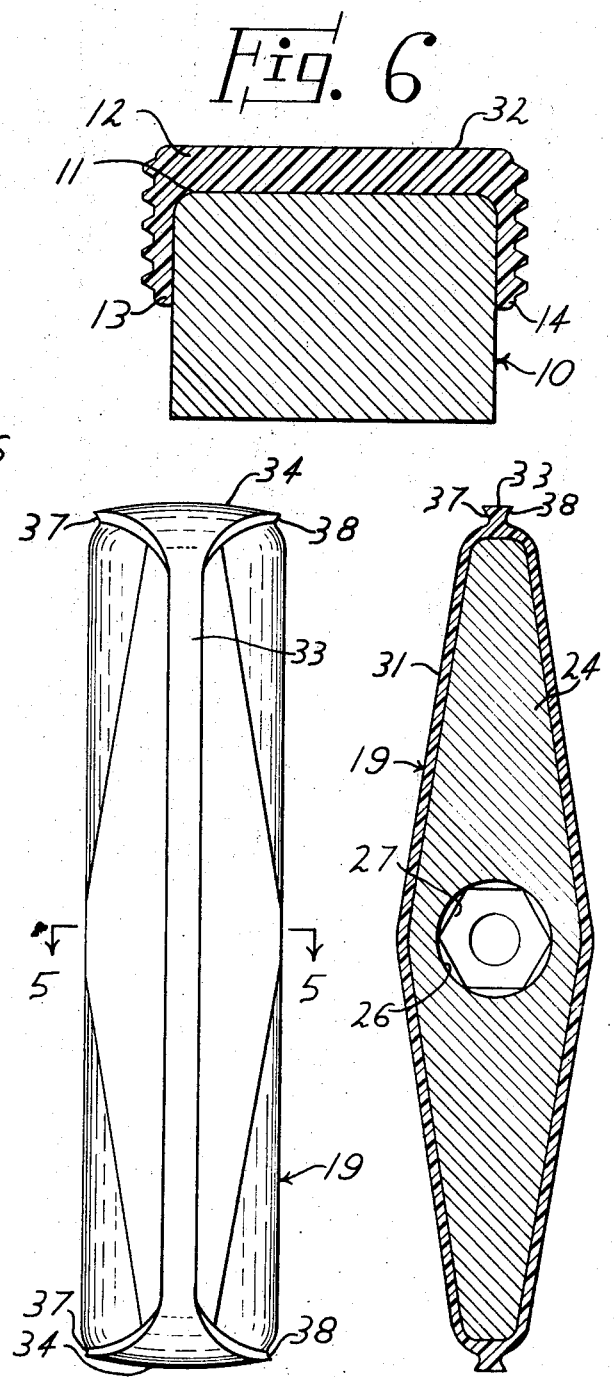
Fig. 6
Fig. 4.  Fig. 5
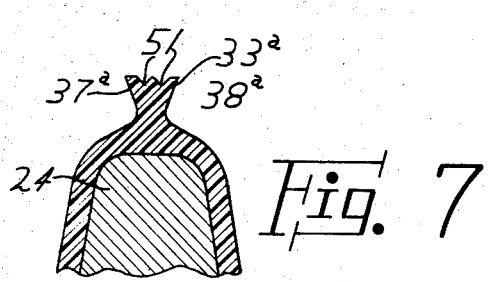
Fig. 7
INVENTOR
George W. Smith
BY
Jennings, Carter + Thompson
Attorneys 3,565,394

BUTTERFLY VALVE

BACKGROUND OF THE INVENTION

This invention relates to valves and more particularly to valves of the type known as disc or butterfly valves. Heretofore in the art to which my invention relates, difficulties have been encountered in providing a proper seal between the disc edge and the annular seat surface, particularly in the region where the stem portions extend from the disc into journal openings through the annular seat. It has been a common practice to employ a permanent compression of the disc edge against the annular valve seat in the region where the stem portions extend from the disc in both the open position and closed position. The transition from this permanent compression fit to the compression which occurs only on the closure of the valve has been very difficult to achieve heretofore due to the fact that the valve disc has thickened hub portions at the junctures of the disc and stem portions for the purpose of providing a convex annular sealing surface. This annular, convex surface is necessary to provide a continuous sealing member from the narrow disc edge on one side of the stem to the narrow disc edge on the other side of the stem. Accordingly, it has been very difficult to provide fluid-tight seal between the disc and the annular flow passage, particularly in the area where the stem or shaft projects from the valve disc, thus exposing the stem or shaft to the fluids flowing through the flow passage.

BRIEF SUMMARY OF INVENTION

To overcome the above and other difficulties, I provide a butterfly-type valve having a disc with a lip seal around the entire periphery thereof and struck on a spherical radius substantially equal the radius of the annular seat in the flow passageway which is engaged by the lip seal. To provide an effective seal between the stem portions or shaft portions of the disc and the valve seat which surrounds the shaft, I provide an outwardly facing convex seal surface surrounding the shaft and provide an inwardly facing concave seal surface in the annular seat with both seal surfaces being in the shape of a segment of a sphere struck on substantially the same radius as the radius of the annular seat whereby the adjacent seal surfaces surrounding the shaft engage each other with sufficient pressure to provide a fluid-tight seal therebetween regardless of the position of the valve disc relative to the flow passage. To provide a further seal between the valve seat and the adjacent surface of the shaft and the adjacent sealing surface of the disc, I provide an O-ring groove in the valve seat adjacent the shaft with the entire bottom of the O-ring groove being an equal distance from the axial center of the flow passageway through the valve whereby the O-ring groove is of the same depth all the way around the shaft.

Apparatus embodying features of my invention is illustrated in the accompanying drawings, forming a part of this application, in which:

FIG. 3 is a sectional view taken generally along the line 3–3 of FIG. 1, the operating shaft for the valve disc being omitted for the sake of clarity;

FIG. 4 is an enlarged, side elevational view of the valve disc removed from the valve unit;

FIG. 5 is a sectional view taken generally along the line 5–5 of FIG. 4;

FIG. 6 is an enlarged sectional view taken generally along the line 6–6 of FIG. 1, the valve disc being omitted; and FIG. 7 is a fragmental, sectional view showing a modified form of lip seal which may be provided on the periphery of the disc member.

Figures 1, 2:
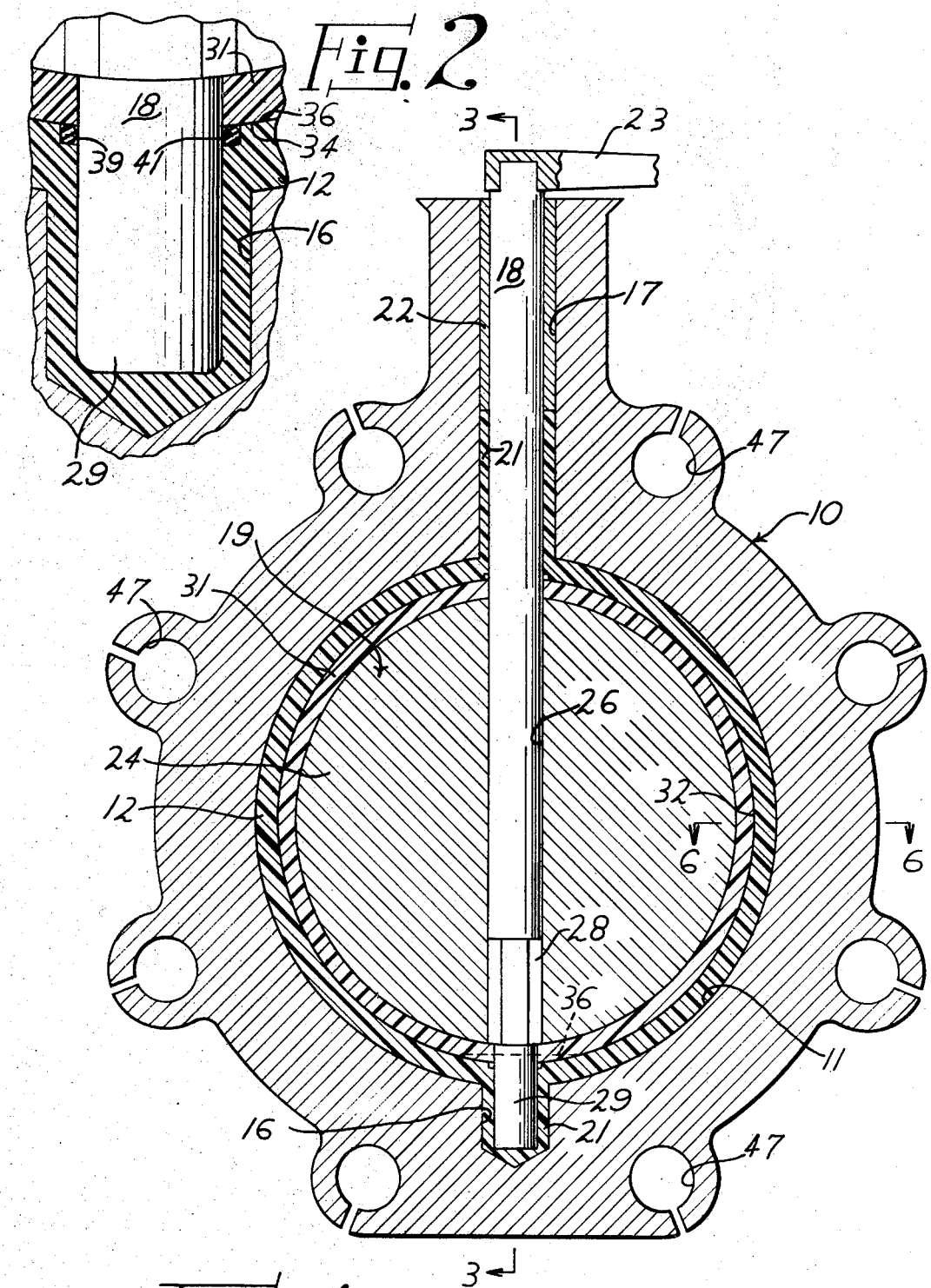
FIG. 1 is a vertical sectional view through the butterfly valve showing the disc member in closed position, the securing bolts being omitted for the sake of clarity.
FIG. 2 is an enlarged, fragmental, sectional view showing the sealing member between the annular valve seat and the adjacent sealing surfaces of the shaft and the valve disc.

Referring now to the drawings for a better understanding of my invention, the butterfly valve includes a body 10 having an opening 11 therethrough which has applied thereto a protective covering 12 which is generally cylindrical, as shown in FIGS. 1 and 3. Formed integrally with opposite sides of the annular or cylindrical covering member 12 are annular flanges 13 and 14 of the covering material which extend along opposite sides of the valve body 10, as shown in FIGS. 3 and 6.

Oppositely disposed apertures 16 and 17 are provided in the valve body 10 for receiving the stem or shaft 18 for a valve disc indicated generally at 19. The covering material 12 extends inwardly of the openings or apertures 16 and 17, as shown at 21 in FIG. 1, to form integral sleeve extensions of the protective covering 12 which encase the shaft 18. The lowermost aperture 16 also has its bottom covered by the protective covering 12 whereby the entire aperture 16 is coated with the protective coating 12. A suitable sleevelike bushing 22 is positioned in the aperture 17 outwardly of the sleeve 21, as shown in FIG. 1. A suitable operating handle 23 is secured to the upper end of the shaft 18 whereby rotary motion may be imparted thereto.

As shown in FIGS. 1 and 3, the disc 19 is in the form of a metal member 24 having an opening 26 therethrough for receiving the shaft 18. The lower portion of the opening 26 is reduced in size as at 27 and is generally in the shape of a hexagon, as clearly shown in FIG. 5. The lower end of the shaft 18 is also of a hexagonal shape as at 28 whereby it engages the hexagon shaped lower end of the opening 26 to thus secure the shaft 18 against rotation relative to the disc 19. The lower end of the shaft 18 is reduced in size as at 29 whereby it is of a diameter to rotate within the sleeve 21 in aperture 16, as shown in FIG. 1. The outer surface of the valve disc 19 is coated with a protective covering 31.

As shown in FIGS. 1, 3 and 6, the inner surface of the protective covering 12 surrounding the inner surface of the opening 11 through the valve body 10 defines an annular flow passageway which is generally cylindrical, as shown in FIG. 6, with the exception of the portion thereof surrounding the apertures 16 and 17. The inner surface of the protective coating 12 thus defines an annular seat 32 which is engaged by the outer surface of the protective coating 31 carried by the valve disc 19.

The valve disc 19 is mounted in the flow passage for rotation about an axis perpendicular to the axis of the flow passage and is provided with a lip seal 33 which extends around the entire periphery of the disc 19 in position to engage the annular seat 32. The valve disc 19 is provided with an outwardly facing, convex seal surface 34 surrounding the opening 26 through the disc, as shown in FIGS. 3 and 4, with the seal surface 34 being in the shape of a segment of a sphere struck on substantially the same radius as the radius of the annular seat 32. The seal surface 34 merges with and is a part of lip seal 33. In like manner, the annular seat 32 is provided with an inwardly facing concave seal surface 36 which is in the shape of a segment of a sphere struck on substantially the same radius as the radius of the annular seat 32. The convex sealing surface 34 being in the shape of a segment of a sphere engages the adjacent convex seal surface 36 which is also in the shape of a segment of a sphere to thus provide a positive seal therebetween to prevent the flow of fluids to the shaft 18 from the flow passage. Since both sealing surfaces 34 and 36 are in the shape of a segment of a sphere and are both struck on a radius substantially equal the radius of the annular seat 32, the sealing surface 32 merges with the bottom of the concave sealing surface 36 whereby the sealing surfaces 34 and 36 engage each other with the same pressure fit regardless of the position of the disc 19 relative to the flow passageway.

As shown in FIGS. 3, 4 and 5, the sealing lip 33 merges with the outwardly facing, convex seal surface 34 surrounding the opening 26 whereby a continuous annular sealing surface is provided for engaging the sealing surface 32 which includes surface 36. The outer surface of the annular sealing lip 33 is the shape of a segment of a sphere, as viewed in cross section, throughout the entire length thereof with the radius of the spherical segment being struck on a radius equal the radius of the annular sealing surface 32 and its sealing surface 36. The outer sides of the sealing lip 33, including the outer sides of the portion thereof defining the convex seal surface 34 flare outwardly as at 37 and 38 to provide sealing lip edges which engage the adjacent sealing surface 32 which includes surface 36. It will thus be seen that while the disc 19 is in the closed position, the sealing lip 33, including the convex seal surface 34, engages the sealing surface 32 and its concave surface 36, thus providing a fluidtight seal which is aided by the pressure of the fluid flowing through the valve which exerts pressure against the lip to force the lip against the annular valve seat. In addition to the sealing lip 33, I employ a slight interference fit between the disc and the annular valve seat of approximately .003 to .004 of an inch. Preferably, the protective coatings 12 and 31 are formed of a fluorocarbon resin, such as polyvinylidene fluoride sold under the trade name "KYNAR."

To provide a further seal between the concave sealing surface 36 and the adjacent surfaces of the shaft 18 and the convex sealing surface 34, I provide an annular recess 39 in the concave seal surface 36 for receiving an O-ring 41 which may be made of a suitable material, such as tetrafluoroethylene, sold under the trade name "TEFLON." By providing the O-ring seal around the shaft 18, additional seal protection is provided, especially, while pressures are so low that the lip action cannot take place between the lip seal 33 and the inner surface of the annular valve seat. As shown in FIG. 2, the bottom of the annular groove 39 for receiving the O-ring 41 is of the same depth all the way around the shaft 18. This is accomplished by forming the annular groove 39 whereby the entire bottom surface thereof is struck on a spherical radius which is the same distance from the axial center of the annular seat 32.

As shown in FIG. 3, the valve body 10 may be secured to suitable annular flanges 42 and 43 carried by adjacent conduits 44 and 46, respectively. Angularly spaced openings 47 are provided in the body 10 for receiving bolts 48 having nuts 49 whereby the flanges 42 and 43 are drawn toward the body 10 to thus clamp the annular flanges 13 and 14 of the protective coating 12 therebetween to thus form a fluidtight seal between the body 10 and the conduits 44 and 46.

In FIG. 7 of the drawings, I show a modified form of my invention in which the circumferential lip seal is indicated at 33a. The lip seal 33a is provided with outwardly flaring sides 37a and 38a. Instead of providing a smooth, convex outer surface for the lip seal 33a, a plurality of laterally spaced circumferential grooves 51 are provided in the outer surface thereof to provide laterally spaced, circumferential lips which are adapted to engage the inner surface of the annular seat 32.

From the foregoing description, the operation of my improved butterfly valve will be readily understood. While the disc 19 is either in the closed or open position, the sealing surfaces 34 and 36, being in the shape of a segment of a sphere, engage each other with a positive fit to prevent the passage of fluid from the flow passageway to the shaft 18. To provide a further seal to protect the shaft against coming in contact with the materials conveyed through the valve, the O-ring 41 engages the adjacent sealing surface of the convex sealing surface 34 and the adjacent surface of the shaft 18 whereby the shaft 18 is further protected from coming in contact with the fluids conveyed through the valve. The O-ring seal 41 is particularly helpful while the pressure within the valve is so low that the seal action between the lip seal and the sealing surface 32 and its concave sealing surface 36 cannot take place. As the disc 19 is rotated to closed position, the lip seal 33 engages the sealing surface 32 and its concave sealing surface 36 whereby, with the aide of the fluid pressure within the valve, the lip seal is forced into sealing engagement with the annular valve seat 32 which includes the sealing surface 36. The slight interference fit between the disc 19 and the annular valve seat also assures positive sealing of the valve disc against the annular valve seat upon movement of the disc to closed position.

From the foregoing, it will be seen that I have devised an improved butterfly valve which is particularly adapted for conveying corrosive materials or materials which would damage the shaft of the valve in the event such materials contacted the shaft. By providing sealing surfaces 34 and 36 which are both the shape of a segment of a sphere struck on a radius equal the radius of the annular valve seat, I provide a positive seal around the operating shaft regardless of the position of the disc relative to the flow passage. That is, the sealing surfaces 34 and 36 remain in the same position relative to each other regardless of the position of the valve disc. Also, by providing the O-ring seal around the shaft with the O-ring fitting in a groove having a bottom which is of the same depth all the way around the shaft, a positive seal is further provided between the shaft 18 and the adjacent sealing surfaces 34 and 36. Furthermore, by providing a circumferential sealing lip which extends all the way around the disc, together with the interference fit between the lip seal and the annular sealing surfaces 32, a fluidtight seal is provided between the valve disc and the annular valve seat cooperating therewith. Furthermore, by providing the concave sealing surfaces 36 which are in the shape of a segment of a sphere struck on a radius substantially equal the radius of the annular seat of the valve, the disc may be readily installed by inserting the disc 19 inwardly of the annular seal 32 at an angular position removed from the spherical recesses 36 and then rotating the disc until the convex, spherical surfaces 34 move into engagement with the sealing surfaces 36. A shaft 18 is then installed in the conventional manner.

While I have shown my invention in but two forms, it will be obvious to those skilled in the art that it is not so limited, but is susceptible of various other changes and modifications without departing from the spirit thereof.

I claim:
1. A butterfly-type valve comprising:
   a. a body having a flow passage therethrough with an annular seat on the inner surface thereof;
   b. a valve disc mounted in said flow passage for rotation about an axis perpendicular to the axis of said flow passage and having a lip seal at its periphery engageable with said annular seat;
   c. an operating shaft extending transversely of said flow passage and through said valve disc;
   d. said valve disc having an outwardly facing convex seal surface surrounding said shaft with said convex seal surface being in the shape of a segment of a sphere struck on substantially the same radius as the radius of said annular seat; and
   e. said annular seat having an inwardly facing concave seal surface in the shape of a segment of a sphere struck on substantially the same radius as the radius of said annular seat and engageable with said convex seal surface of said valve disc with a positive fit for sealing therebetween to prevent the flow of fluids to said shaft from said flow passage.

2. A butterfly-type valve as defined in claim 1 in which the outer surface of said lip seal at the periphery of said valve disc, as viewed in cross section, is struck on a spherical radius substantially equal the radius of said annular seat.

3. A butterfly-type valve as defined in claim 1 in which said annular seat is provided with diametrically opposed apertures therein for receiving said operating shaft and a said concave seal surface surrounds each of said apertures with a said convex seal surface of said valve disc engaging each said concave seal surface.

4. A butterfly-type valve as defined in claim 1 in which an annular recess is provided in the inner surface of said concave seal surface of said annular seat adjacent and surrounding said operating shaft and an O-ring is mounted in said recess to define a seal between said concave seal surface and said shaft and between said concave seal surface and said convex seal surface.

5. A butterfly-type valve as defined in claim 4 in which the entire bottom of said annular recess in said concave seal surface is struck on a spherical radius which is the same distance from the axial center of said annular seat so that said annular recess is the same depth all the way around said shaft.

6. A butterfly-type valve as defined in claim 1 in which said lip seal at the periphery of said valve disc comprises a plurality of circumferential lips spaced laterally from each other as viewed in cross section.

7. A butterfly-type valve as defined in claim 1 in which said annular seat on the inner surface of said flow passage and the outer surface of said valve disc including the lip seal is in the form of a protective covering.

8. A butterfly-type valve as defined in claim 7 in which said protective covering is a fluorocarbon resin.

9. A butterfly-type valve as defined in claim 8 in which the fluorocarbon resin is polyvinylidene fluoride.

10. A butterfly-type valve as defined in claim 1 in which a slight interference fit is provided between said valve disc and said annular seat ranging from approximately .003 to .004 of an inch.